US006449273B1

United States Patent
Jennings, III (12)

(10) Patent No.: US 6,449,273 B1
(45) Date of Patent: Sep. 10, 2002

(54) MULTI-PORT PACKET PROCESSOR (75) Inventor: Earle W. Jennings, III, San Jose, CA (US)

(73) Assignee: Hyundai Electronics America, San Jose, CA (US)

(*) Notice: Subject to any disclaimer, the term of this patent is extended or adjusted under 35 U.S.C. 154(b) by 0 days.

(21) Appl. No.: 09/145,824

(22) Filed: Sep. 2, 1998

Related U.S. Application Data (60) Provisional application No. 60/057,813, filed on Sep. 4, 1997.

(51) Int. Cl.[7] .................. H04L 12/28; H04L 12/56; G06F 15/16; G06F 15/173
(52) U.S. Cl. .............. 370/389; 370/391; 370/463; 709/200; 709/235; 709/244
(58) Field of Search ................ 370/229, 389, 370/391, 395, 401, 402, 445, 446, 447, 466, 428, 338, 463, 465; 709/200, 235, 244

(56) References Cited

U.S. PATENT DOCUMENTS 5,303,078 A * 4/1994 Brackett et al. ............ 370/395
5,515,376 A * 5/1996 Murthy et al. ............. 370/402
5,610,910 A * 3/1997 Focsaneanu et al. ........ 370/351
6,002,675 A * 12/1999 Ben-Michael et al. ...... 370/445
6,091,707 A * 7/2000 Egbert et al. .............. 370/428

* cited by examiner

Primary Examiner—Wellington Chin
Assistant Examiner—Maikhanh Tran
(74) Attorney, Agent, or Firm—Townsend and Townsend and Crew LLP (57) ABSTRACT

A multi-port packet processor on an integrated circuit provides an efficient means to interface multiple high-speed packet-based communications channels. The multi-port packet processor includes multiple port processors. Each port processor can include a channel interface for coupling to a respective communications channel, a channel processor for processing the data packets received through the channel interface, and an interprocessor communications interface for providing communication between the port processors. The channel interface can be designed to process data packets using a particular set of packet-based protocols. Alternatively, the channel interface can be designed having programmable controls to allow processing of data packets using a selected set, from a number of possible sets, of packet-based protocols.

9 Claims, 9 Drawing Sheets

MULTI-PORT PACKET PROCESSOR

This application claims the benefit of U.S. provisional Application No. 60/057,813, filed Sep. 4, 1997, which is incorporated herein by reference.

BACKGROUND OF THE INVENTION

This invention relates generally to a computer network, and in particular to a multi-port packet processor for processing communication within a computer network.

A computer network is an interconnection of various computers by a network of communication devices (often utilizing more than one communications protocols). One such example of a computer network is the Internet that interconnects personal computers and servers through telephone lines and high-speed transmission lines. Other examples of computer network include a local area network (LAN), a wide area network (WAN), and other special purpose networks including networks based upon protocols such as RS-485 instrumentation protocol and Universal Serial Bus (USB). The interconnection of (relatively) smaller devices into a network facilitates transactions of large scale organizations, allows for efficient dissemination of information, provides for communications between various devices within the network, and allows for sharing of resources and data.

Figure 1:
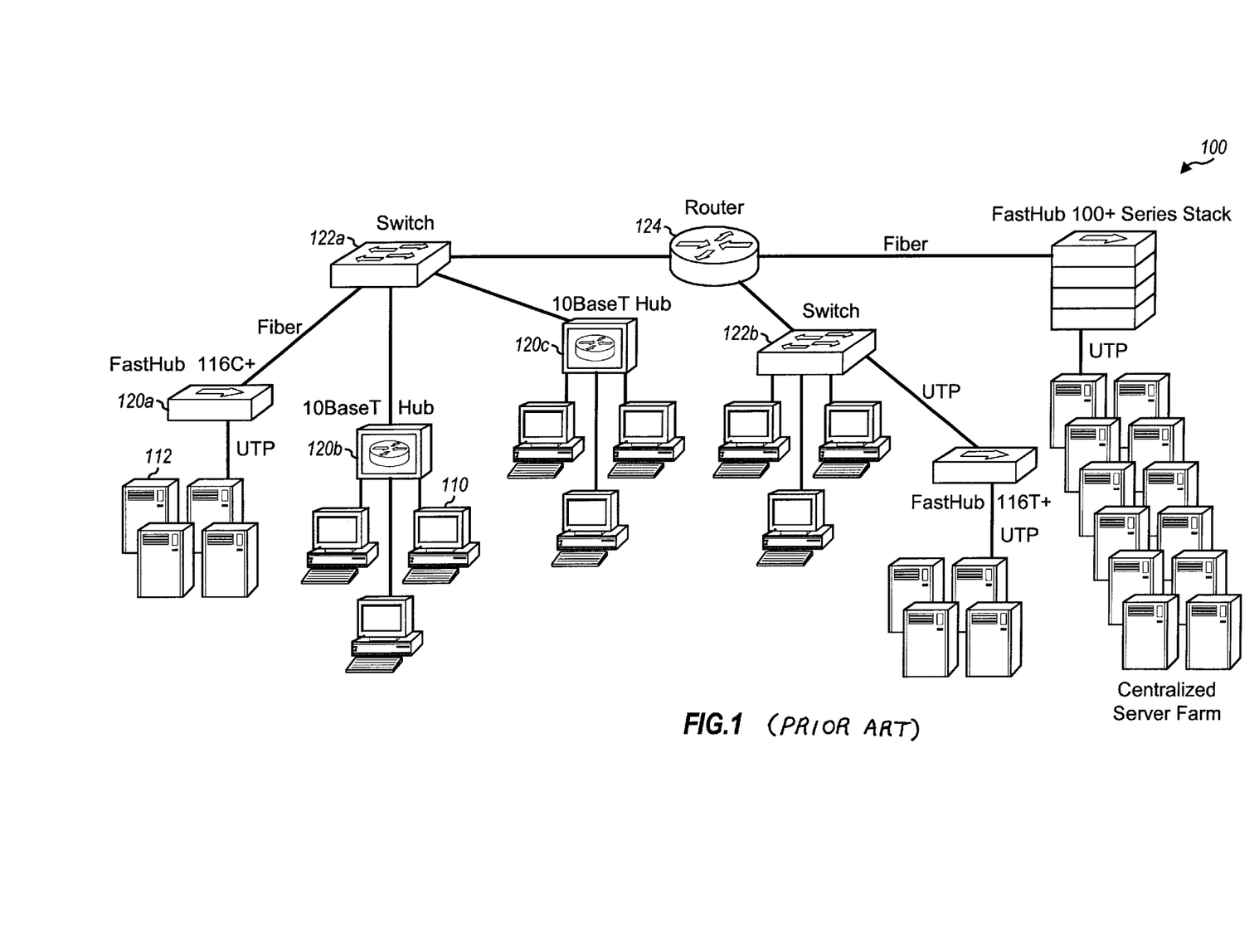
FIG. 1 illustrates a conventional computer network.

FIG. 1 illustrates a conventional computer network 100. Network 100 includes a number of user computers 110 and servers 112 interconnected together through hubs 120, switches 122, and a router 124. The user computers 110 and servers 112 connect to the network through respective Network Interface Cards (NICs, not shown). The NICs receives data (e.g., in bytes) from the user computer or server and forms data packets for transmission on the network transmission line. The hubs, switches, and routers receive the data packets and direct the packets to the proper destination. At the destination, another NIC receives the data packets and translates the user packets into bytes usable by the computer or server. The interconnection between a pair of devices can be an Unshielded Twisted-Pair (UTP) cable (such as a telephone line), a coaxial cable, a fiber optic cable, or other transmission media.

A network can be viewed as being composed of various layers, with each layer performing a defined function. Each layer communicates with the layer above and/or below it. Furthermore, each layer can be implemented with hardware or software, or a combination of both.

Figure 2:
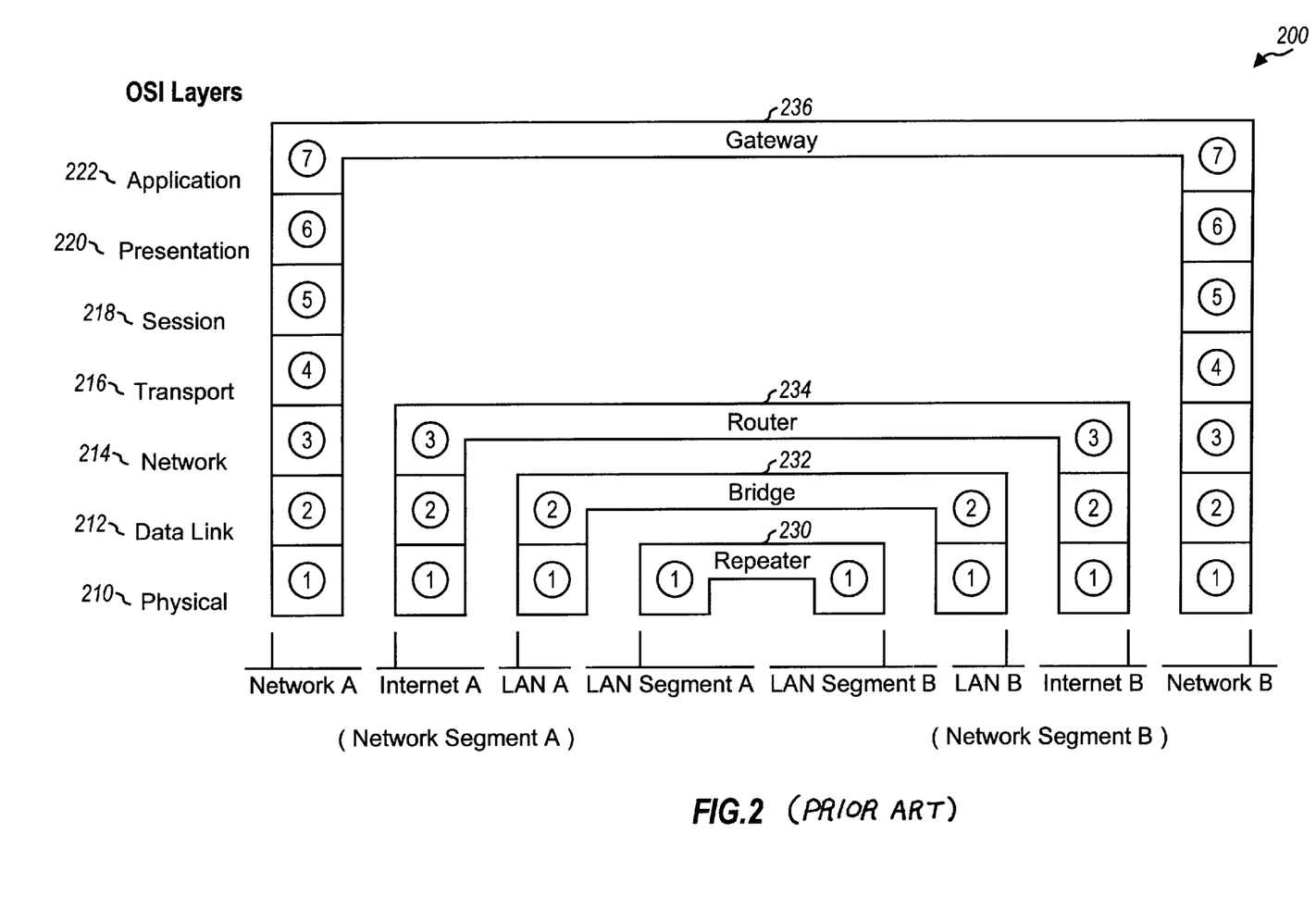
FIG. 2 illustrates various layers of an Open System Interconnection (OSI) computer network.

FIG. 2 illustrates the various layers of an Open System Interconnection (OSI) computer network 200. Computer network 200 is composed of seven layers including: (1) a physical layer 210, (2) a data link layer 212, (3) a network layer 214, (4) a transport layer 216, (5) a session layer 218, (6) a presentation layer 220, and (7) an application layer 222. The physical layer 210 transmits bit streams across the physical transmission system. The data link layer 212 provides for a reliable data transmission. The network layer 214 routes data from one network node to another. The transport layer 216 provides data transfer between two users at a predetermined level of quality. The session layer 218 manages the data exchange. The presentation layer 220 presents information to the users in a meaningful manner. Finally, the application layer 222 monitors and manages the computer network 200.

Communication between the various layers is governed by a set of protocols. The layers and protocols, in turn, define the architecture of a network. Conventionally, many diverse protocols exist that are incompatible with other protocols. Some protocols are adopted by large manufacturers to differentiate their products from those of other manufacturers, or for other reasons. Thus, although a product from one product line can communicate with other products from the same product line, it is often incompatible with other products from other manufacturers. Examples of network protocols include Integrated Services Data Network (ISDN), Ethernet, Fast Ethernet, Gigabit Ethernet, Asynchronous Transfer Mode (ATM), Copper Distributed Data Interface (CDDI), Fiber Distributed Data Interface (FDDI) and Fiber Channel (also known as P1394).

Interconnectivity and interoperability between (compatible and incompatible) networks, or segments of a network, can be provided by interconnection devices (e.g., routers, hubs, bridges, gateways). With the proliferation of networks in the marketplace, and the numerous protocols in used, the interconnection devices become an integral part of many networks. Referring to FIG. 2, a hub 230, which operates on the physical layer 210, is used to connect segments of the same network to form an extended network. A hub is also referred to as a repeater. A bridge 232, which operates on the data link layer 212, is used to connect compatible (or nearly compatible) LANs. A router 234, which operates on the network layer 214, connects two network segments to form one large network. Finally, a gateway 236, which operates on any layer at or above the network layer 214, connects an internal network to an external network. The gateway 236 is the most complex but also most flexible interconnection device, as it allows for different protocols at any or all layers on which it operates.

As networks become larger and faster, new applications requiring greater bandwidth become feasible. Examples of high bandwidth applications include video on demand, video games, and others. These applications place stress on various parts of the network architecture, including the NICs, the communications channel, and the interconnection devices (e.g., the servers). A bottleneck is often created in the data communications system, with one likely area of congestion being the main computer bus of the server.

From the above, it can be noted that a processor that facilitates high-speed data communications is needed.

SUMMARY OF THE INVENTION

According to the invention, a multi-port packet processor provides an efficient mechanism to interface multiple high-speed packet-based communications channels to each other. The multi-port packet processor is implemented within an integrated circuit for low cost, high performance, and improved reliability.

The multi-port packet processor includes multiple port processors. Each port processor can include a channel interface for coupling to a respective communications channel and a channel processor for processing the packets received through the channel interface. The channel interface can be designed to process packet-based communication from a channel using a particular set of packet-based protocols. Alternatively, the channel interface can be designed having programmable control such that the channel interface can be configured to send and receive packets using a selected set (from a number of possible sets) of packet-based protocols.

Each port processor can further include an interprocessor communications interface coupled to at least one other port processor for providing communication between the port processors.

In a specific embodiment, the port processor is capable of processing multiple communications channels concurrently.

The communications channels can have identical packet-based protocols or different packet-based protocols.

The multi-port packet processor can be used in a variety of applications. In one application, the multi-port packet processor functions as a local area network (LAN) processor and provides the functions typically provided by a LAN server. In another application, the multi-port packet processor functions as a disk storage processor and manages data transfer between various storage devices.

The invention will be better understood by reference to the following detailed description with accompanying drawings.

DETAILED DESCRIPTION OF SPECIFIC EMBODIMENTS

LAN Hub

Figure 3:
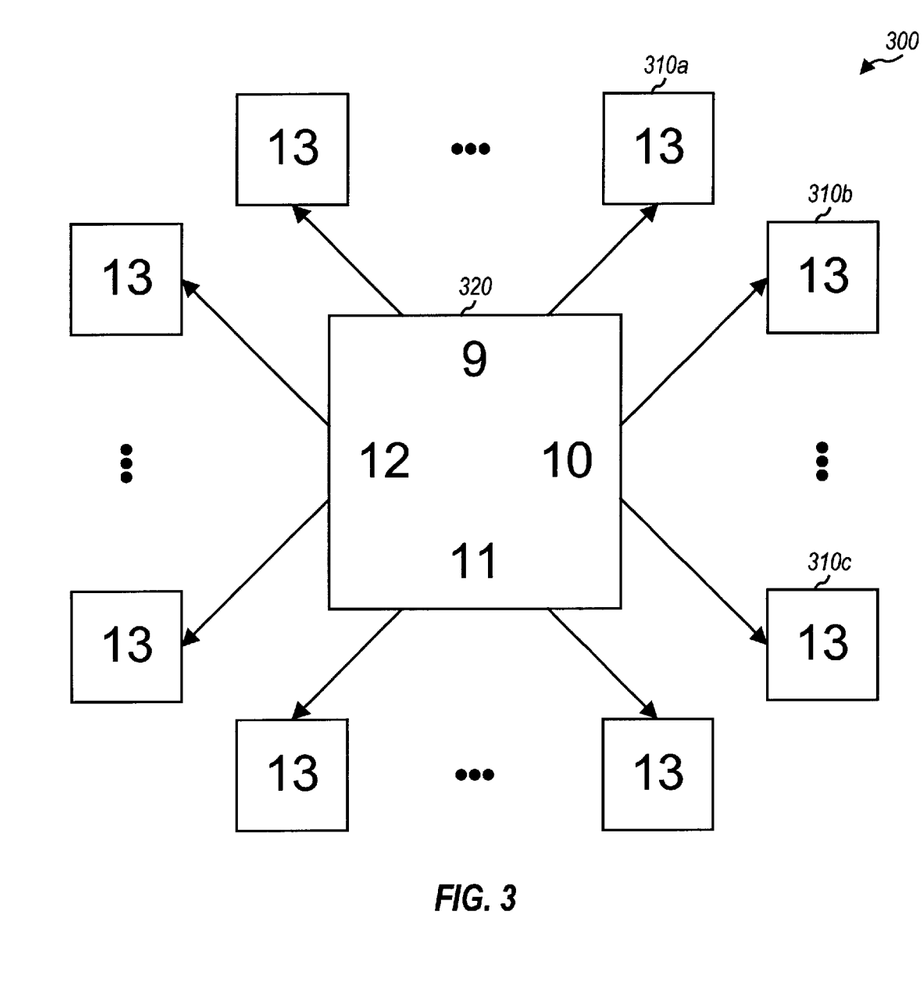
FIG. 3 is a simplified block diagram illustrating a local area network (LAN) channel communications hub.

FIG. 3 is a simplified block diagram illustrating a local area network (LAN) channel communications hub 300. LAN hub 300 includes a number of packet-based protocol channels 310 coupled to a multi-port processor 320. LAN hub 300 can correspond to hub 120 in the network shown in FIG. 1. Channels 310 (shown symbolically as blocks in FIG. 3) include different LAN channels such as ISDN, Ethernet, Fast Ethernet, Gigabit Ethernet, ATM, CDDI, FDDI, or P1394 (also known as Firewire) channels, or other communications channels. Furthermore, the various channels 310 shown in FIG. 3 may utilize different types of protocols. For example, some channels 310 may support mass storage communications protocols (e.g., Small Computer Systems Interface SCSI) while other channels 310 may support LAN protocols (e.g., Ethernet).

Multi-Port Processor

Figure 4A:
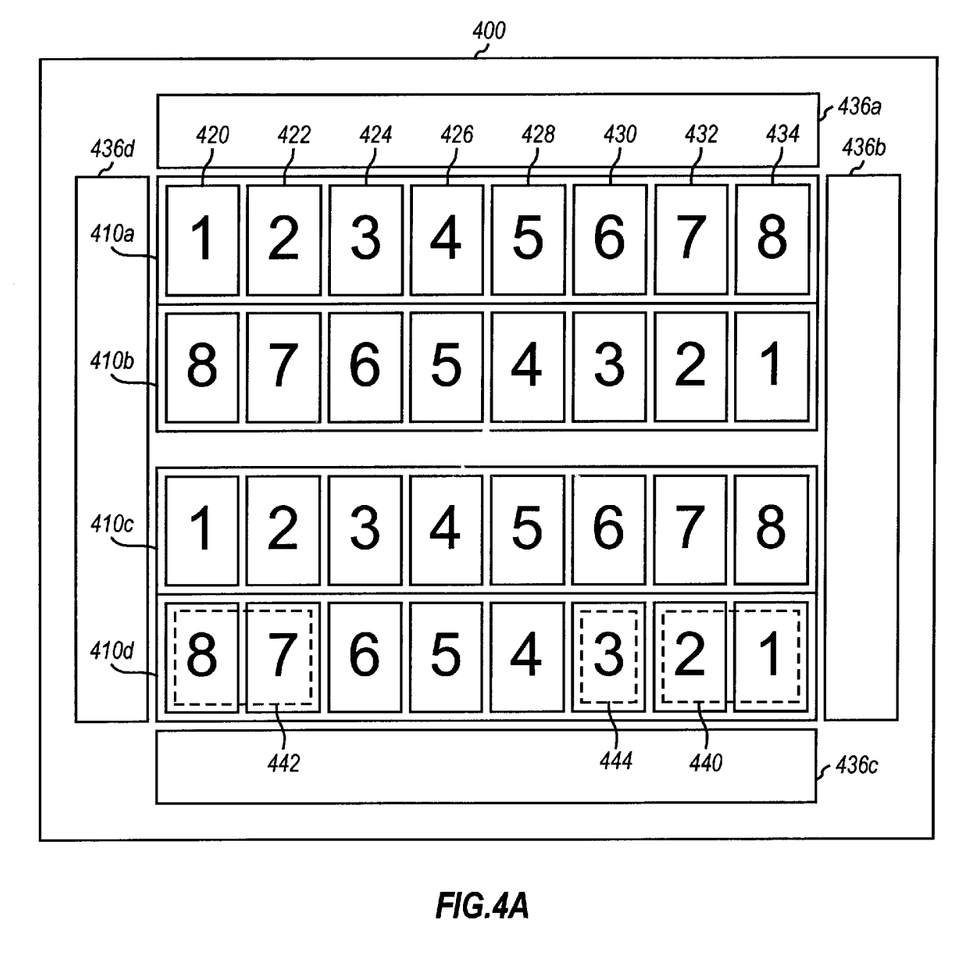
FIG. 4A is a block diagram of one embodiment of an integrated multi-port processor.

FIG. 4A is a block diagram of one embodiment of an integrated multi-port processor 400. Multi-port processor 400 can operate as multi-port processor 320 in FIG. 3. Multi-port processor 400 efficiently controls and manages communication through multiple packet-based protocol channels 310. Conventionally, this function is performed by a larger device, such as a LAN server.

Multi-port processor 400 includes a number of port processors 410. In the embodiment shown in FIG. 4A, there are four port processors 410 and each port processor 410 includes eight circuits. The eight circuits include: (1) input/output (I/O) buffers 420, (2) I/O controllers 422, (3) an interprocessor communications circuit 424, (4) a channel processor 426, (5) a cache controller 428, (6) an internal memory 430, (7) a memory controller 432, and (8) memory buffers 434. Each of the circuits is further discussed below.

I/O buffers 420 provide buffering of data packets received from, and to be transmitted on, the communications channel. I/O controllers 422 direct reception and transmission of the data packets and can include a temporary storage element for queuing packets and performing data processing tasks such as encryption/decryption, format conversion and error correction/detection operations upon the data of one or more packets.

Interprocessor communications circuit 424 can include an interrupt controller for triggering specific real-time actions in response to either network conditions, higher level network control commands, or other port processors and an interprocessor I/O circuit. The interprocessor I/O circuit can include clock timer counters and other circuits.

Channel processor 426 directs the operation of port processor 410 and can be implemented as a microprocessor, a microcomputer, a microcontroller, an applications specific integrated circuit (ASIC), a digital signal processor (DSP), a finite state machine (such as a register store, Field Programmable Gate Array-FPGA, or Complex Programmable Logic Device-CPLD), or similar circuits. Cache controller 428 can include a cache (e.g., a first level cache). Internal memory 430 provides storage for data and program codes and can be implemented as a random-access memory (RAM), a dynamic random-access memory (DRAM), a read-only memory (ROM), a FLASH memory, other similar devices, or a combination of the above. Additionally, internal memory 430 can include a boot ROM (or possibly a boot FLASH memory) for initializing port processor 410. In one embodiment, internal memory 430 can include enough memory (i.e., enough RAM, ROM, and other memories) such that an external memory is not required. Memory controller 432 directs the exchange of data between port processor 410 and an external memory. Memory buffers 434 provides buffering of data received from, and to be transmitted to, the external memory.

As shown in FIG. 4A, multi-port processor 400 further includes a support circuit 436 for each port processor 410. In particular, support circuits 436a, 436b, 436c, and 436d couple to port processors 410a, 410b, 410c, and 410d, respectively. Support circuit 436 can include I/O circuits, a memory, drivers, and other circuits. Support circuit 436 facilitates communication between port processor 410 and the one or more communications channels associated with the port processor. Support circuits 436 can provide analog conversion for different physical signal states for communicating bits on the coupled communication channel. For example, this analog conversion can transform logic signal (e.g., for zero and one) to drive a laser which requires a different signaling convention.

Communication Mechanisms

Referring to the embodiment shown in FIG. 4A, each port processor 410 includes three communications mechanisms: (1) a channel interface 440, (2) an external memory interface 442, and (3) an internal processor (or interprocessor) communications interface 444. Channel interface 440 includes I/O buffers 420 and I/O controllers 422. External memory interface 442 includes memory controller 432 and memory buffers 434. Interprocessor communications interface 444 includes interprocessor circuit 424.

Channel interface 440 can be designed to process packet-based communication from a channel using a particular set of packet-based protocols. Alternatively, channel interface 440 can be designed having programmable controls such that the channel interface can be configured to send and receive packets using a selected set (from a number of possible sets) of packet-based protocols. The programmability can be provided by implementing channel interface 440 (i.e., I/O controller 424) with a processor, a finite state machine, or other suitable devices. The processor or finite state machine can be designed with the capability to initiate and operate using one of various sets of states. Such processors or finite state machines may either be fixed program or reconfigurably programmable.

An interprocessor communications network is made up of multiple interprocessor communications interfaces 444. The interprocessor communications network can interconnect all port processors 410, or a subset of port processors 410. Furthermore, the interprocessor communications network includes a communications mechanism that can include packet data transfer and (possibly) transfer command/status signals.

The interprocessor communications network allows the various port processors 410 to coordinate and efficiently manage communication between two or more communications channels. For example, one port processor 410 may be assigned to one channel utilizing a particular set of protocols and another port processor 410 may be assigned to another channel utilizing the same or a different set of protocols. The interprocessor communications network allows for communication between two (possibly incompatible) channels. In this manner, the interprocessor communications network behaves like bridge 232 or router 234 as shown in FIG. 2.

Note the shape of the port processors 410a, 410b, 410c and 410d. The circuits are shown as roughly rectangular, which is the approximate shape they would possess in an integrated circuit layout. The individual components of the port processors would not necessarily be approximately the same size, but are shown this way for diagrammatic convenience. The individual components of the port processors would however be approximately rectangular.

Further note the arrangement of the port processors 410a, 410b, 410c and 410d. They are arranged so that the long axis orientation is flipped for neighboring port processors. Preferred embodiments include pairs of port processors sharing the same orientation and neighboring pairs being flipped. Another preferred embodiment where the port processors do not possess external memory interfaces include only two groups of port processors in one integrated circuit, where each group shares an orientation and one group's orientation is flipped from the other group's orientation.

Further note the placement of the interprocessor communications interface 444. These circuits are optimally placed within the port processor so as to minimize the total wire length required. Accomplishing this requires knowledge of which port processor arrangements are to be implemented. Where there is to be orientation flipping, either the placement should be essentially in the middle of the port processor rectangular shape, or it should be split into two components, which are located at approximately equal distances from the center of the port processor long axis.

Port Processing

In one embodiment, each port processor 410 has the capability to simultaneously interface with one or more packet-based protocol channels. High-speed packet transfers between these channels by one port processor 410 are accommodated by the channel interface communications mechanism (i.e., provided by I/O buffers 420 and I/O controllers 422) within that port processor 410. This transfer activity is controlled by the corresponding channel processor 426 within that port processor 410. This provides for an efficient, low overhead transfer mechanism between the "local" channels within each port processor 410.

In another embodiment, communication between channels coupled to different port processors 410 is provided by the interprocessor communications network. In this embodiment, packet data transfers proceed unimpeded while command and status transactions occur concurrently. Packet data transfer occurs on physically separate channels from command and status information transfers. Neither is slowed by the transfer characteristics of the other.

Port processor 410 can be designed to operate on one or more layers (similar to the design of gateway 236). Referring to FIG. 2, port processor 410 can be designed to operate on physical layer 210, data link layer 212, network layer 214, or a combination of these layers.

Packet transfer and conversion can be partitioned into separate component activities of block data transfer and block data processing. These separable activities are preferably performed by distinct concurrently operating mechanisms, which by and large do not interfere with each other. The block data transfer is further preferably isolated from disruptive intrusions caused by the communication of control and status information through the use of separate communications mechanisms for such activities.

Modular Design

Figure 4B:
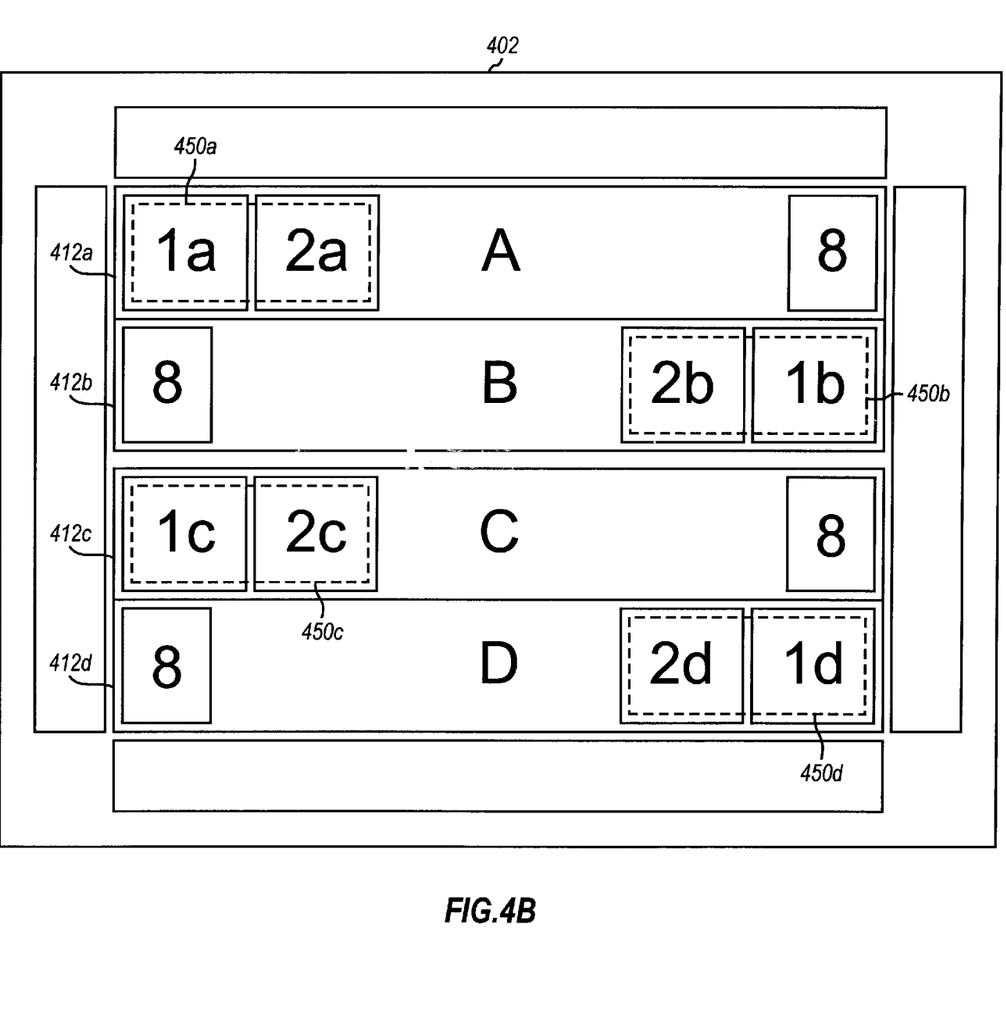
FIG. 4B is a block diagram of another embodiment of an integrated multi-port processor.

FIG. 4B illustrates the flexibility in the design of a multi-port processor because of the modular design of the port processor. A multi-port processor 402 can interface and process data transmissions using various packet-based protocols. Alternatively, multi-port processor 402 may interface and process just one data transmission using just one packet-based protocol. As shown in FIG. 4B, port processors 412a, 412b, 412c, and 412d include channel interfaces 450a, 450b, 450c, and 450d, respectively. Each channel interface 450 can be designed with a particular set of I/O buffers and I/O controllers corresponding to the packet-based protocols to be utilized. Alternatively, as described above, each channel interface 450 can have programmable controls to allow processing of packets using a selected set of protocols from among a number of sets of protocols. For example, one channel interface 450 of multi-port processor 402 can support ISDN or Ethernet, another channel interface 450 can support ATM, and another channel interface 450 can support SCSI. As another example, a four port multi-port packet processor can include one Gigabit Ethernet port processor, one Fast Ethernet port processor, one Ethernet port processor, and one Fiber Channel port processor interfacing to a disk farm.

Figure 4C:
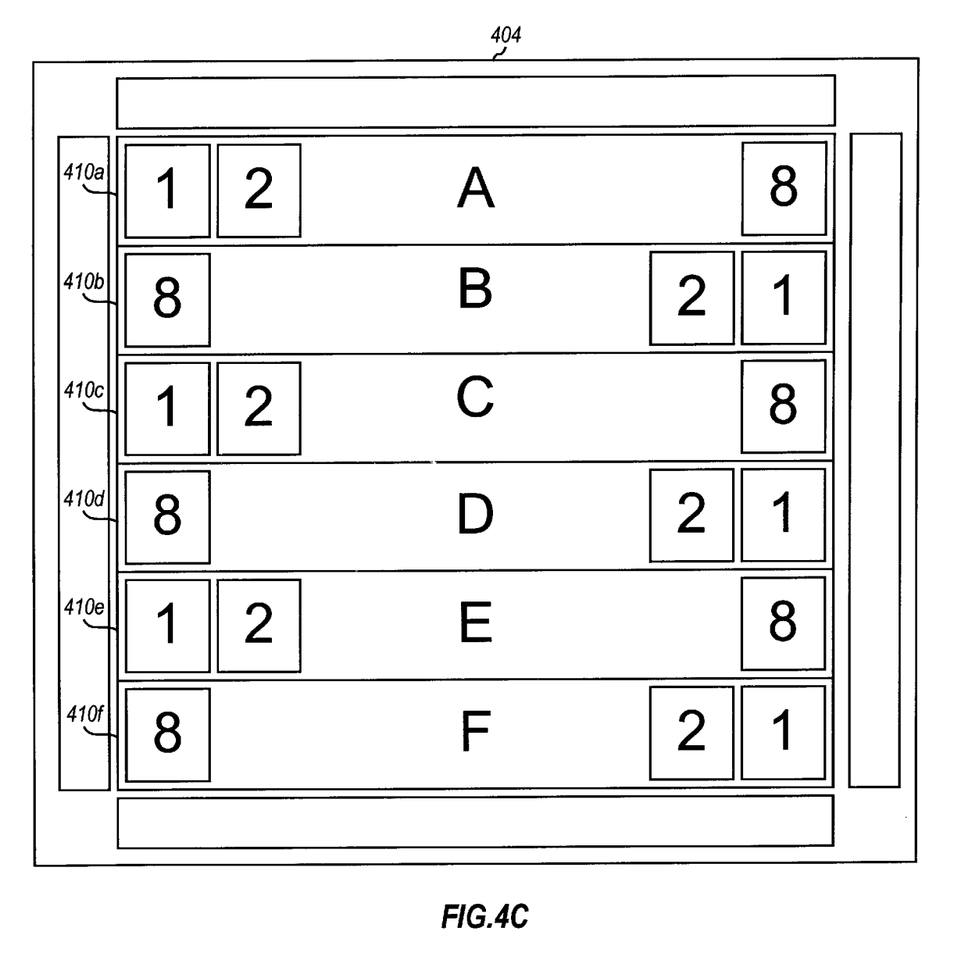
FIG. 4C is a block diagram of yet another embodiment of an integrated multi-port processor.

FIG. 4C is a block diagram illustrating a multi-port processor 404 including six port processors 410. Multi-port processor 404 is different in configuration than multi-port processor 400 (see FIG. 4A) which includes only four port processors 410. As these examples show, the multi-port processor can be designed to include any number of port processors, including two, four, six, eight, sixteen, thirty-two, or any other number. Although an even number of port processors can provide certain advantages (e.g., layout efficiency), odd number of port processors can also be designed and utilized. Again, as described above, each port processor 410 can include a different channel interface (i.e., different set of I/O buffers and I/O controllers) or a programmable channel interface.

Referring to FIGS. 4A through 4C, each port processor is shown having a single channel interface. However, a port processor can be designed to include any number channel interfaces. Furthermore, each port processor can be designed with a channel interface without regards (i.e., individually and independently) to the other port processors within the multi-port processor. For example, a multi-port processor can be designed such that one port processor includes one channel interface, a second port processor includes two channel interfaces, a third port processor includes three channel interfaces, and so on. Examples of this include multiple RS-485 channels to support GPIB instrumentation protocols and dual USB channels.

Other Applications of Multi-port Processor

Figure 5:
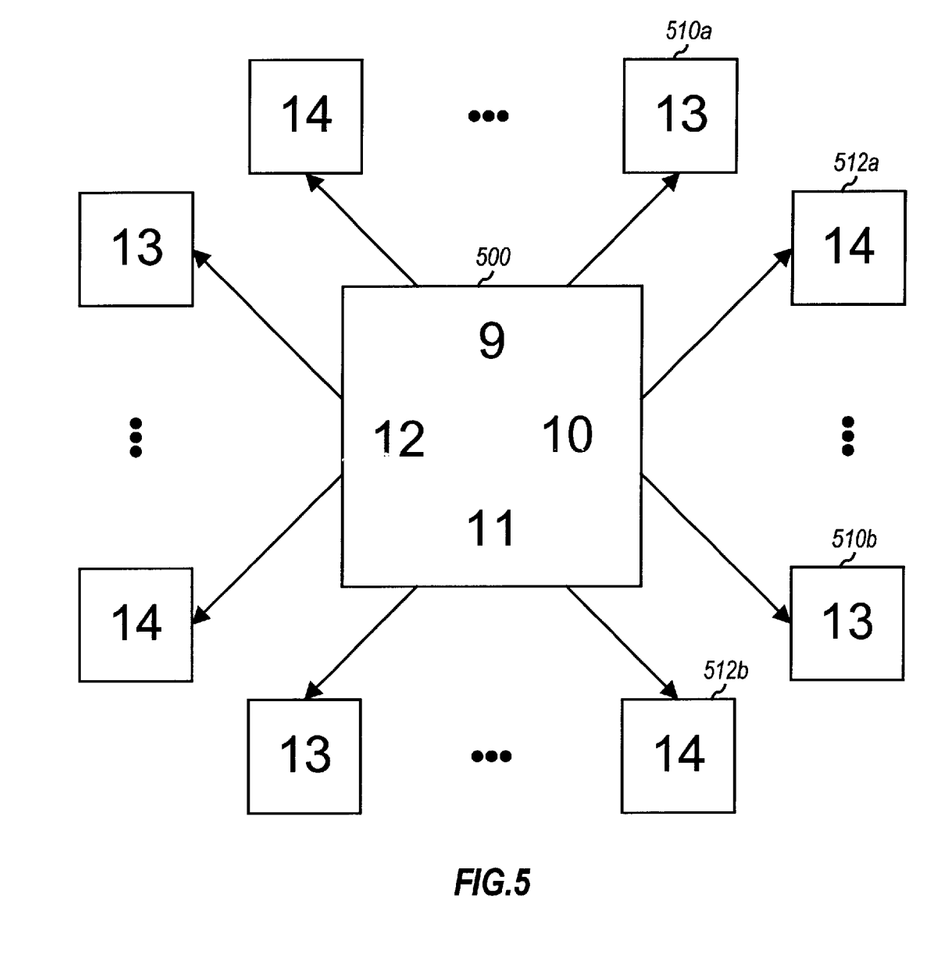
FIG. 5 shows a specific application wherein a multi-port processor is used to process data transfer in a mass storage environment.

FIG. 5 shows a specific application wherein a multi-port processor 500 is used to process data transfer in a mass storage environment. This environment is commonly referred to as a "disk farm". The disk farm includes a number of storage devices (e.g., hard disk drives, tape drives, CD drives, floppy disk drives, or other storage devices). Each storage device couples to multi-port processor 500 through a respective communications channel 510 or 512. An example of a disk farm is a Redundant Disk RAID system that provides mass disk storage with a level of redundancy for increased system reliability. Conventionally, this data transfer control requires a complex device.

Figure 6:
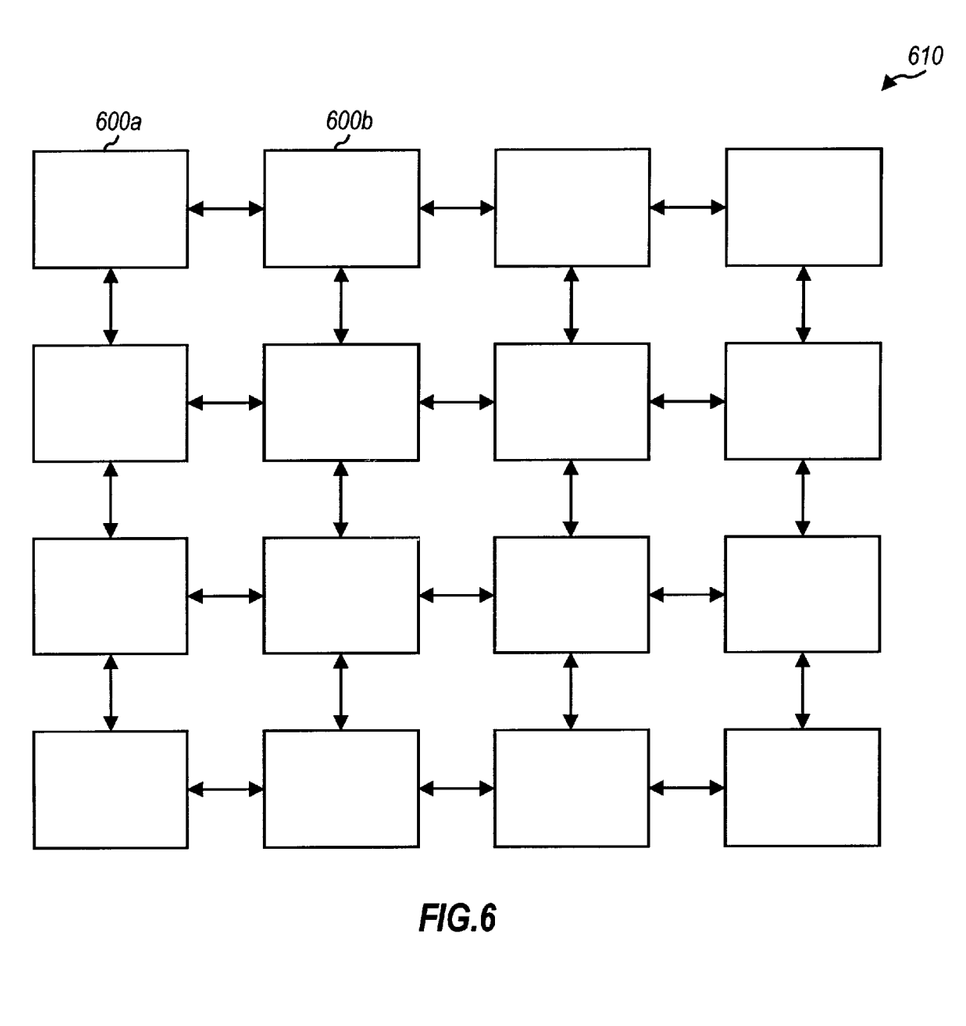
FIG. 6 shows another specific application wherein a number of multi-port processors are configured as a two-dimensional grid packet server.

FIG. 6 shows another specific application wherein a number of multi-port processors 600 are configured as a two-dimensional grid packet server 610. FIG. 6 shows a four by four grid of multi-port processors 600. However, other dimensions can also be used, and symmetry is generally not required. In one embodiment, a portion of the packet-based communications channels of each multi-port processor 600 is used for communication in the row and column in which the particular multi-port processor 600 is located. These channels may have different protocols. For example, one channel may employ the P1394 protocol to provide higher bandwidth within server 610. The remaining channels can be used for providing communication with the network.

Figure 7:
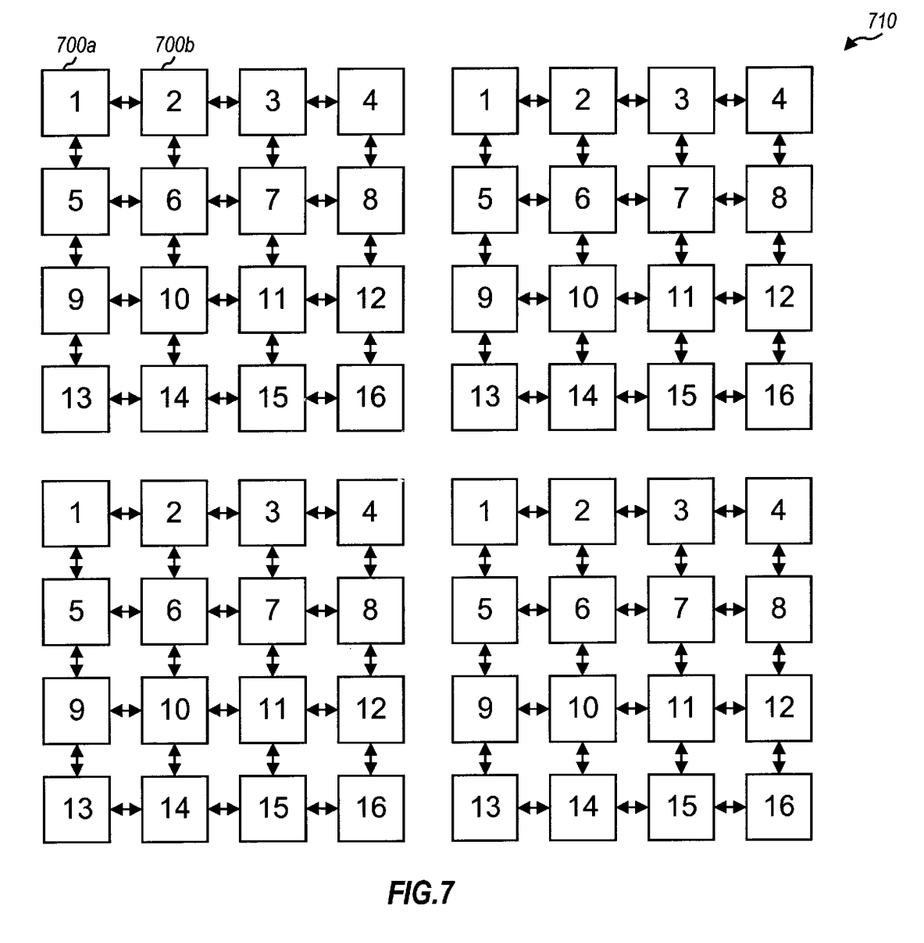
FIG. 7 shows yet another specific application wherein a number of multi-port processors are configured as a three-dimensional grid packet server.

FIG. 7 shows yet another specific application wherein a number of multi-port processors 700 are configured as a three-dimensional grid packet server 710. FIG. 7 shows a four-by-four-by-four grid of multi-port processors 700. However, other dimensions can also be used and symmetry is again generally not required. In one embodiment, a portion of the packet-based communications channels of each multi-port processor 700 is used for communication in the row, column, and quadrant in which the particular multi-port processor 700 is located. These channels may have different protocols.

The structures shown in FIGS. 6 and 7 can be extended to a four-dimensional array of multi-port processors, a five-dimensional array of multi-port processors, or an M-dimensional array of multi-port processors, where M is any integer.

The previous description of specific embodiments is provided to enable any person skilled in the art to make or use the present invention. The various modifications to these embodiments will be readily apparent to those skilled in the art, and the generic principles defined herein may be applied to other embodiments without the use of the inventive faculty. For example, each port processor can include different circuits than that shown in FIGS. 4A through 4C, depending on the functionality required. Thus, the present invention is not intended to be limited to the embodiments shown herein but is to be accorded the widest scope consistent with the principles and novel features disclosed herein and as defined by the following claims.

What is claimed is:

1. A multi-port packet processor comprising:

a plurality of port processors implemented within one integrated circuit, each port processor comprising
a channel interface coupled to at least one communications channel, and
a channel processor coupled to the channel interface and operative to process data packets received or transmitted via the communications channel, and
wherein the port processors are arranged in rectangular strips disposed along a first axis in the integrated circuit,
wherein a subset of the port processors are flipped about the first axis.

2. The multi-port packet processor of claim 1 wherein the channel interface of at least one port processor supports more than one packet-based protocol.

3. The multi-port packet processor of claim 2, wherein the channel interface of at least one port processor supports a set of packet-based protocols and can be programmably reconfigured to process data packets using a protocol selected from the set of packet-based protocols.

4. The multi-port packet processor of claim 2, wherein the packet-based protocols include at least one of an Integrated Services Data Network (ISDN), an Ethernet, a Fast Ethernet, a Gigabit Ethernet, an Asynchronous Transfer Mode (ATM), a Copper Distributed Data Interface (CDDI), a Fiber Distributed Data Interface (FDDI), a RS-485 GPIB, and a P1384.

5. The multi-port packet processor of claim 1, wherein the port processors are arranged as pairs of port processors and wherein pairs of adjacent port processors are flipped about the first axis.

6. A local area network (LAN) processor comprising:

a plurality of port processors, wherein the port processors are arranged in rectangular strips disposed along a first axis in the integrated circuit, each port processor coupled to a respective communications channel and operative to provide packet-based processing using respective packet-based protocols,
wherein the plurality of port processors are implemented within one semiconductor integrated circuit,
wherein a subset of the port processors are flipped about the first axis.

7. A multi-port processor comprising:

a plurality of port processors implemented within one integrated circuit and configured to operate on packets at a physical layer, wherein the port processors are arranged in rectangular strips disposed along a first axis in the integrated circuit, each port processor comprising
a channel interface coupled to at least one communications channel, and
a channel processor coupled to the channel interface and operative to process data packets received or transmitted via the communications channel,
wherein a subset of the port processors are flipped about the first axis.

8. A grid array processor comprising:

a plurality of multi-port packet processors arranged in a two-dimensional array, each multi-port packet processor coupled to at least one other multi-port packet processor and including
a plurality of port processors, wherein the port processors are arranged in rectangular strips disposed along a first axis in the integrated circuit, each port processor coupled to at least one respective communications channel and operative to provide packet-based processing using respective packet-based protocols, a subset of the port processors being flipped about the first axis; and wherein each multi-port packet processor is implemented within one semiconductor integrated circuit.

9. A multi-dimensional grid array processor comprising:

a plurality of multi-port packet processors arranged in a multi-dimensional array, each multi-port packet processor coupled to at least one other multi-port packet processor and including a plurality of port processors, wherein the port processors are arranged in rectangular strips disposed along a first axis in the integrated circuit, each port processor coupled to at least one respective communications channel and operative to provide packet-based processing using respective packet-based protocols; and wherein each multi-port packet processor is implemented in one semiconductor integrated circuit, wherein a subset of the port processors are flipped about the first axis.

* * * * *